United States Patent Office 2,981,348
Patented Apr. 25, 1961

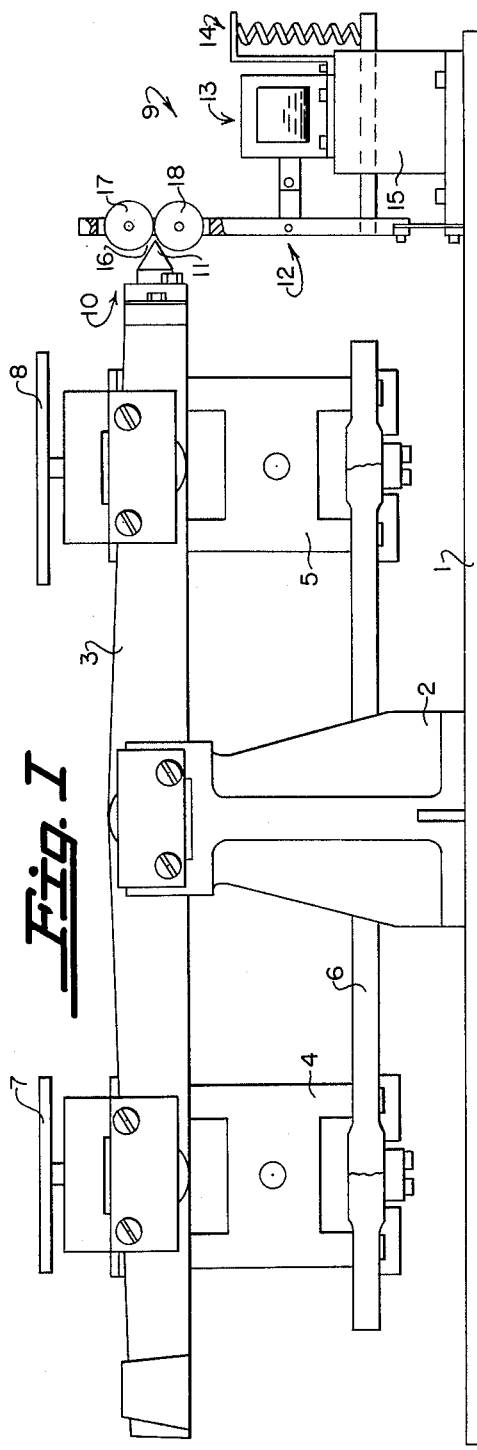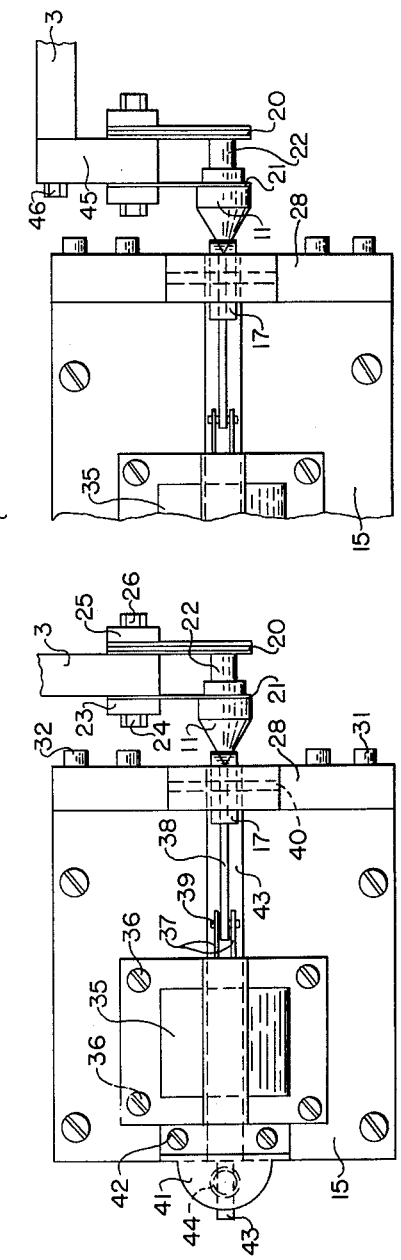

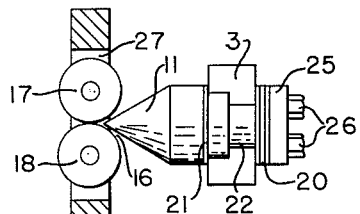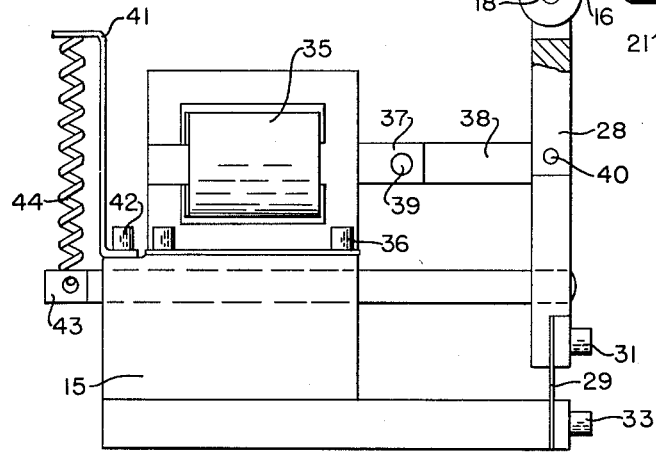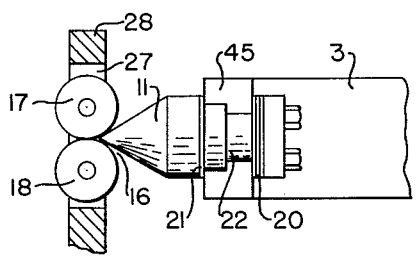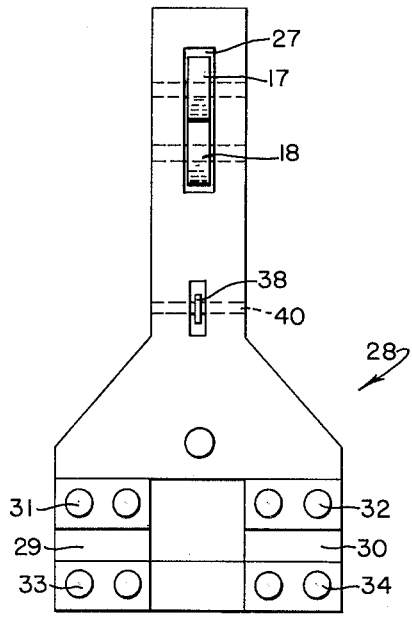

2,981,348

BEAMLOCKS

Harlan A. Hadley, Toledo, Ohio, assignor, by mesne assignments, to Toledo Scale Corporation, Toledo, Ohio, a corporation of Ohio Filed Aug. 23, 1957, Ser. No. 679,932

3 Claims. (Cl. 177—157)

This invention relates to weighing scales of the oscillating "over-under" type which are used in the check-weighing of commodities and more particularly to a weighing scale beamlock which functions to restrain the movement of a beam or lever of the weighing scale during non-weighing periods.

It has been proven that through the immobilization of a lever of a weighing scale during non-weighing periods by a beamlock, that inaccuracies in weighing due to the loading and unloading of the weighing scale while it continues to oscillate are minimized. Also a great reduction of wear on the knife-edged pivot supports and bearings of the weighing scale is evident.

A type of beamlock shown in my patent application Serial No. 411,476 anchored the lever of the weighing scale against movement and held it in a generally horizontal position during non-weighing periods by employing a nonresilient latch member linked to the lever and a cooperating retractable V-notched lock member mounted on the scale base. Such a beamlock, though doing its prescribed job of restraining the lever, had the great disadvantage of causing the lever of the weighing scale to fluctuate vigorously during the locking and unlocking procedures.

An object of this invention is to provide a beamlock which is free of the foregoing and other disadvantages and which is simple in construction and smooth in operation.

Another object of this invention is to provide an improved beamlock which functions to hold a lever against movement and in a generally horizontal position, thus eliminating unnecessary and damaging oscillation during non-weighing periods.

Another object of this invention is to provide a beamlock which is solenoid activated and so quick acting that it may be incorporated in a rapid weighing means which in turn is operated in conjunction with a rapid conveyor system.

Another object of this invention is to provide a novel application of flat steel springs in mounting a latch unit of a beamlock upon the lever or other oscillatable element of a weighing mechanism.

Another object of this invention is to provide a novel application of steel flexure plates in mounting a keeper unit of a beamlock upon a keeper base unit.

Another object of this invention is to provide a novel application of rollers in a keeper unit of a beamlock.

Further objects and numerous advantages of the invention will be apparent from the following description in which reference is had to the accompanying drawings.

In the drawings wherein preferred embodiments of the invention are shown:

Fig. I is a side elevational view of a weighing scale of the "over-under" type showing a beamlock with its conical latch detent so mounted as to be movable parallel to the longitudinal axis of the scale's lever.

Fig. II is a plan view of a modified form of the beamlock showing a conical latch detent so mounted as to be movable perpendicularly with reference to the longitudinal axis of the lever.

Fig. III is a side elevational view of the beamlock shown in Fig. II.

Fig. IV is a fragmentary plan view of the beamlock shown in Fig. I.

Fig. V is a fragmentary side elevational view of the beamlock shown in Fig. IV.

Fig. VI is a front elevational view of a keeper stanchion plate which is an element of each of the beamlocks shown in Figs. I to V.

The specific figures and the accompanying description are intended merely to illustrate the invention and not to impose limitations on the claims.

The weighing means of the "over-under" type scale consists of an equal arm balance supported upon a base 1. A fulcrum stand 2 is erected upon the base 1 and pivotally supports upon its upper extremity a lever 3, which in turn has spiders 4 and 5 pivotally mounted thereon at equal distances from the axis on which the fulcrum stand 2 pivotally supports the lever 3. The spider 4 has one end of a check link 6 pivoted to its lower portion and a poise platter 7 secured to its upper portion. The poise platter 7 serves to hold a poist to offset the weight of normal loads in the check-weighing procedure for which the "over-under" scale is used. Likewise, the spider 5 has the other end of the check link 6 pivoted to its lower portion while secured upon its upper portion is a commodity platter 8.

Fig. I shows the beamlock 9 installed to cooperate with an end of the lever 3 to hold the lever 3 inoperative and in a generally horizontal position during non-weighing periods.

The beamlock 9 as shown consists essentially of a latch unit 10 which includes a conical latch detent 11, a keeper unit 12, an energizable solenoid unit 13, a counteracting spring unit 14 and a keeper base unit 15. In the locked condition a channel 16 formed between rollers 17 and 18 embraces the conical latch detent 11, but upon energization of the solenoid unit 13 the keeper unit 12 is retracted and thus frees the conical latch detent 11 of the latch unit 10.

The conical latch detent 11, as shown in Figs. II and III, which moves perpendicularly to the longitudinal axis of the lever 3, is flexibly mounted upon the lever 3 through a plurality of flat steel springs. These springs are grouped into two assemblages 20 and 21 separated by a spacer 22, with the larger assemblage of springs 20 being located on the end of the spacer 22 farthermost from the conical latch detent 11. One assemblage of springs 21 is mounted on the front side of the lever 3 by a front plate 23 and two screws 24 which are securely fastened in tapped holes of a back plate 25. The other assemblage of springs 20 is mounted on the back side of the lever 3 by the back plate 25 and two screws 26 which are securely fastened in tapped holes in the front plate 23.

The conical latch detent 11 is aligned so as to cooperate with the channel 16 formed between rollers 17 and 18 which are rotatably mounted in a slot 27 of a keeper stanchion plate 28 of the keeper unit 12 of the beamlock 9.

The keeper stanchion plate 28 is flexibly attached to the keeper base unit 15 through two steel flexure plates 29 and 30 (shown in Fig. VI) which are secured to the keeper stanchion plate 28 by screws 31 and 32 and to the keeper base unit 15 by screws 33 and 34.

The channel 16 formed by the rollers 17 and 18 is made to embrace and release the conical latch detent 11 by moving the keeper stanchion plate 28. A solenoid 35, which is fastened to the elevated portion of the keeper base unit 15 by screws 36, moves the keeper stanchion plate 28 in a direction to free the conical latch detent 11.

The movable prongs 37 of the solenoid 35 are attached to the end of a keeper link 38 by a pin 39. The other end of the keeper link 38 is pivotally fastened to the keeper stanchion plate 28 by a pin 40.

Through the use of the aforementioned linkage the channel 16 formed between the rollers 17 and 18 is disengaged from the spring mounted conical latch detent 11 as the solenoid 35 is energized, thus giving the lever 3 freedom of movement.

The solenoid 35 may be energized manually by pushing a button or otherwise closing a switch.

As the solenoid 35 is deenergized the counteracting springs unit 14 of the beamlock 9 speeds the channel 16 formed by the rollers 17 and 18 of the keeper stanchion plate 28 back into engagement with the spring mounted conical latch detent 11, thus shortening the locking time appreciably.

The counteracting spring unit 14 is composed of a Z-shaped upper bracket 41 which is held stationary with respect to the keeper base unit 15 by screws 42, a lower shaft 43 which is embedded in and peened to the keeper stanchion plate 28, and an intermediate coil spring 44 which puts tension on the system causing the keeper stanchion plate 28 to return to the locked position.

The embodiment of the invention shown in Figs. I, IV and V is useful where due to lack of space or for some other reason it is not feasible to install the spring mounted conical latch detent 11 movably perpendicular to the longitudinal axis of the lever 3 or other oscillatable member.

In this embodiment a cross-member 45 is secured upon one end of the lever 3 by screws 46 and the spring mounted conical latch detent 11 is affixed to the cross-member 45 instead of to the lever 3. In so doing the spring mounted conical latch detent 11 is transposed into a position movable parallel to the longitudinal axis of the lever 3.

To summarize, it is the incorporation of the flat steel springs 20 and 21 upon the conical latch detent 11, the attachment of the keeper stanchion plate 28 to the keeper base unit 15 by steel flexure plates 29 and 30, and the installation of rollers 17 and 18 in the keeper stanchion plate 28 which has eliminated the undesirable and damaging fluctuation of the lever 3 or other oscillatable members during the locking and unlocking procedures. Thus, a beamlock with exceptionally smooth operational characteristics has been devised.

*Operation*

As a package is placed upon the commodity platter 8 of the weighing scale a solenoid 35 is energized either manually or automatically and the keeper stanchion plate 28 through the flexing of flexure plates 29 and 30 is smoothly retracted a sufficient distance so that the channel 16 between the rollers 17 and 18 will be pulled away from the conical latch detent 11 thus allowing the lever 3 or another oscillatable member to move freely. After the weight of the package has been observed the solenoid 35 is deenergized and thereupon, through the tension placed upon it by the counteracting spring unit 14, the keeper stanchion plate 28 is rapidly moved back into its original position where the channel 16 between the rollers 17 and 18 is in complete engagement with the conical latch detent 11 and the lever 3, or another oscillatable member, is again locked in a horizontal position.

Various modifications and changes may be made in the details of construction of the beamlock without departing from the spirit and scope of the invention.

Having described the invention, I claim:

1. In a weighing scale having a movable member, a lock for holding the movable member against oscillation while the scale is being loaded and unloaded and for freeing the movable member during weighments, the lock comprising, in combination, a latch unit and a keeper unit, the latch unit including a conical detent and resilient means for mounting the conical detent upon the movable member, the keeper unit including a keeper member, at least one flexure plate for pivotally mounting the keeper member, a pair of rollers carried by the keeper member at a point remote from the flexure plate and shiftable into and out of embracing engagement with the conical detent, resilient means operatively connected to the keeper member at a point intermediate the flexure plate and the rollers for urging the rollers toward the conical detent, and selectively operated means for retracting the rollers in opposition both to the flexure plate and the resilient means from such embracing engagement.

2. In a weighing scale having relatively movable members including a frame and an oscillatable beam pivoted upon the frame, a beamlock for holding the beam against oscillation while the scale is being loaded and unloaded and for freeing the beam during weighments, the beamlock comprising, in combination, a latch unit and a keeper unit, the latch unit including a conical detent and resilient means for mounting the conical detent upon one of the relatively movable members, the keeper unit including a pivotally mounted keeper member, a pair of rollers carried by the keeper member and shiftable into and out of embracing engagement with the conical detent, resilient means so operatively connected to the keeper member that the rollers are continuously urged toward the conical detent, and selectively operated means for retracting the rollers from such embracing engagement.

3. In a weighing scale having a movable member, a lock for holding the movable member against oscillation while the scale is being loaded and unloaded and for freeing the movable member during weighments, the lock comprising, in combination, a latch unit and a keeper unit, a first one of the units being mounted on the movable member and the other unit being mounted adjacent such first one of the units, the units including conical detent means and roller socket means, resilient mountings for the conical detent means and for the roller socket means, one of such means being shiftable into and out of engagement with the other such means, the shiftable means being urged toward such engagement by its said resilient mounting, and a resilient device and a selectively operated device each operatively connected to the shiftable means, one of the devices functioning to move the shiftable means toward such engagement and the other of the devices functioning to move the shiftable means for such engagement in opposition to the resilient mounting of the shiftable means.

References Cited in the file of this patent

UNITED STATES PATENTS

| 1,688,221 | Abbey | Oct. 16, 1928 |
| 2,097,753 | Bennett | Nov. 2, 1937 |

FOREIGN PATENTS

| 812,646 | France | Feb. 8, 1937 |
| 743,407 | Great Britain | Jan. 18, 1956 |

UNITED STATES PATENT OFFICE
CERTIFICATE OF CORRECTION

Patent No. 2,981,348                                    April 25, 1961

Harlan A. Hadley

It is hereby certified that error appears in the above numbered patent requiring correction and that the said Letters Patent should read as corrected below.

Column 4, line 56, for "for" read -- from --.

Signed and sealed this 6th day of February 1962.

(SEAL)
Attest:

ERNEST W. SWIDER                                  DAVID L. LADD
Attesting Officer                                     Commissioner of Patents